(12) United States Patent
Noguchi et al.

(10) Patent No.: US 8,631,890 B2
(45) Date of Patent: Jan. 21, 2014

(54) ELECTRIC CONSTRUCTION MACHINE

(75) Inventors: Akira Noguchi, Koka (JP); Masayuki Yunoue, Koka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/513,894

(22) PCT Filed: May 24, 2011

(86) PCT No.: PCT/JP2011/061905
§ 371 (c)(1),
(2), (4) Date: Jun. 5, 2012

(87) PCT Pub. No.: WO2011/158618
PCT Pub. Date: Dec. 22, 2011

(65) Prior Publication Data
US 2013/0075171 A1  Mar. 28, 2013

(30) Foreign Application Priority Data
Jun. 15, 2010 (JP) .................................. 2010-136361

(51) Int. Cl.
*B60K 11/06* (2006.01)
(52) U.S. Cl.
USPC ......... 180/68.1; 180/68.5; 180/311; 361/676; 361/678; 429/120; 429/148; 429/163; 429/175
(58) Field of Classification Search
USPC ............... 180/68.1, 68.2, 68.5, 311; 361/676, 361/678, 695, 679.49, 679.5, 724; 429/148, 429/163, 167, 175–177; 383/100
See application file for complete search history.

(56) References Cited

U.S. PATENT DOCUMENTS

| | | | | |
|---|---|---|---|---|
| 2,022,595 A | * | 11/1935 | Gowing | 429/65 |
| 2,288,538 A | * | 6/1942 | Morrison | 454/237 |
| 3,583,459 A | * | 6/1971 | Nappe | 383/110 |
| 3,918,994 A | * | 11/1975 | Davis | 429/145 |
| 4,200,685 A | * | 4/1980 | Klootwyk et al. | 429/70 |

(Continued)

FOREIGN PATENT DOCUMENTS

| | | | | |
|---|---|---|---|---|
| EP | 1164646 A1 | * | 12/2001 | H01M 2/10 |
| JP | 11-140906 A | | 5/1999 | |

(Continued)

OTHER PUBLICATIONS

International Search Report received in International Application No. PCT/JP2011/061905 dated Jan. 24, 2013.

*Primary Examiner* — John R Olszewski
*Assistant Examiner* — Steve Clemmons
(74) *Attorney, Agent, or Firm* — Mattingly & Malur, PC

(57) ABSTRACT

The object of the present invention is to provide an electric construction machine capable of efficiently cooling the battery mounted on the swing structure. To achieve the object, there is provided an electric construction machine in which a battery storage room 11 is formed in the swing structure 3 and a plurality of batteries 231 as electric power sources are arranged in the battery storage room 11, comprising: a battery storage structure 23 storing the batteries 231 and having an air flow channel through which air can flow upward from a lower part of the battery storage structure 23; a covering sheet 26 entirely covering the top and side faces of the battery storage structure 23; and a duct 27 for discharging the air, one end of which is arranged in an upper part of the covering sheet 26.

25 Claims, 8 Drawing Sheets

(56) References Cited

U.S. PATENT DOCUMENTS

| | | | |
|---|---|---|---|
| 4,484,420 A * | 11/1984 | Stokes | 52/2.18 |
| 4,699,855 A * | 10/1987 | Abraham et al. | 429/175 |
| 5,028,087 A * | 7/1991 | Ells | 296/24.41 |
| 5,171,439 A * | 12/1992 | Vakharia | 383/100 |
| 6,048,099 A * | 4/2000 | Muffett et al. | 383/20 |
| 6,151,211 A * | 11/2000 | Dayan et al. | 361/690 |
| 2004/0050008 A1* | 3/2004 | Mintie et al. | 52/646 |
| 2004/0057210 A1* | 3/2004 | Wilson et al. | 361/695 |
| 2004/0169030 A1* | 9/2004 | Seibert et al. | 219/386 |
| 2005/0202237 A1* | 9/2005 | Fryberger et al. | 428/354 |
| 2006/0199505 A1* | 9/2006 | Fettkether | 454/232 |
| 2007/0196728 A1* | 8/2007 | Yang | 429/120 |
| 2008/0264291 A1* | 10/2008 | Pike et al. | 105/50 |
| 2011/0212380 A1* | 9/2011 | Andreas-Schott et al. | 429/469 |

FOREIGN PATENT DOCUMENTS

| | | |
|---|---|---|
| JP | 2002-327461 A | 11/2002 |
| JP | 2004-168149 A | 6/2004 |
| JP | 2005-180103 A | 7/2005 |

\* cited by examiner

ELECTRIC CONSTRUCTION MACHINE

TECHNICAL FIELD

The present invention relates to an electric construction machine comprising a battery and an electric motor driven by electric power supplied from the battery, and in particular, to an electric construction machine capable of efficiently cooling the battery.

BACKGROUND ART

In some electric construction machines, the battery is installed in a rear part of the swing structure and poisonous gas generated during the charging of the battery is discharged to the outside of the rear cover of the swing structure (see Patent Literature 1, for example).

PRIOR ART LITERATURE

Patent Literature
Patent Literature 1: JP,A 11-140906

SUMMARY OF THE INVENTION

Problem to be Solved by the Invention

Such electric construction machines having the battery installed in the rear part of the swing structure are being requested to store as many battery cells as possible in the limited space (limited capacity) in the rear part of the swing structure since the battery has to have a sufficiently large capacity (amount of storable electricity) for the work and operations required of the construction machine. In small-sized construction machines, for example, approximately 40% of the surface area of the swing structure needs to be ensured for battery cell storage.

Meanwhile, heat emitted by the battery during the electric charging/discharging can cause deterioration in the electricity storage performance of the battery and shorten the operating time of the construction machine. When a lot of batteries are installed and stored in the limited space (capacity) in the rear part of the swing structure, the need of increasing the battery cooling efficiency arises. The battery cooling efficiency can be increased by enlarging the heat radiating area of the batteries. However, the enlargement of the heat radiating area requires enlargement of the space for storing the batteries, which causes a problem contradictory to the aforementioned request.

The object of the present invention, which has been made in consideration of the above situation, is to provide an electric construction machine capable of efficiently cooling the batteries mounted on the swing structure.

Means for Solving the Problem

In order to achieve the above object, a first invention provides an electric construction machine in which a battery storage room is formed in a swing structure and a plurality of batteries as electric power sources are arranged in the battery storage room, the electric construction machine comprising: a battery storage structure storing the batteries and having an air flow channel through which air can flow upward from a lower part of the battery storage structure; a flexible covering sheet entirely covering the top and side faces of the battery storage structure; and a duct for discharging the air, one end of which is arranged in an upper part of the covering sheet.

A second invention provides an electric construction machine in which a battery storage room is formed in a rear part of a swing structure and a plurality of batteries as electric power sources are arranged in the battery storage room, comprising: a battery storage structure storing the batteries and having an air flow channel through which air can flow upward from a lower part of the battery storage structure; a flexible covering sheet entirely covering the top and side faces of the battery storage structure; and a duct for discharging the air, one end of which is arranged in an upper part of the covering sheet.

A third invention provides an electric construction machine according to the first or second invention, wherein the other end of the duct is connected to a room from which air is forcefully discharged.

A fourth invention provides an electric construction machine according to the third invention, wherein the room from which air is forcefully discharged is a machine room which is provided in the swing structure to store devices such as a hydraulic pump, an electric motor, an inverter, an oil tank, a heat exchanger, a cooling fan and which discharges air from the inside to the outside of the room with a cooling fan.

A fifth invention provides an electric construction machine according to the third invention, wherein the other end of the duct is equipped with an exhaust fan.

A sixth invention provides an electric construction machine according to any one of the first through fifth inventions, wherein the one end of the duct is connected to the top of the covering sheet.

A seventh invention provides an electric construction machine according to any one of the first through fifth inventions, wherein the one end of the duct is connected to an upper part of one of the side faces of the covering sheet.

An eighth invention provides an electric construction machine according to any one of the first through seventh inventions, wherein the covering sheet is formed of a waterproof sheet.

A ninth invention provides an electric construction machine according to any one of the first through seventh inventions, wherein the covering sheet is formed of an antistatic sheet.

Effect of the Invention

According to the present invention, the batteries can be cooled efficiently by the forceful supply of air to the batteries. The efficient battery cooling makes it possible to install as many batteries as possible in the battery storage room without the need of enlarging the battery storage room.

MODE FOR CARRYING OUT THE INVENTION

In the following, an electric construction machine in accordance with an embodiment of the present invention will be described with reference to the accompanying drawings, by taking application of the present invention to a hydraulic shovel as an example.

Figure 1:
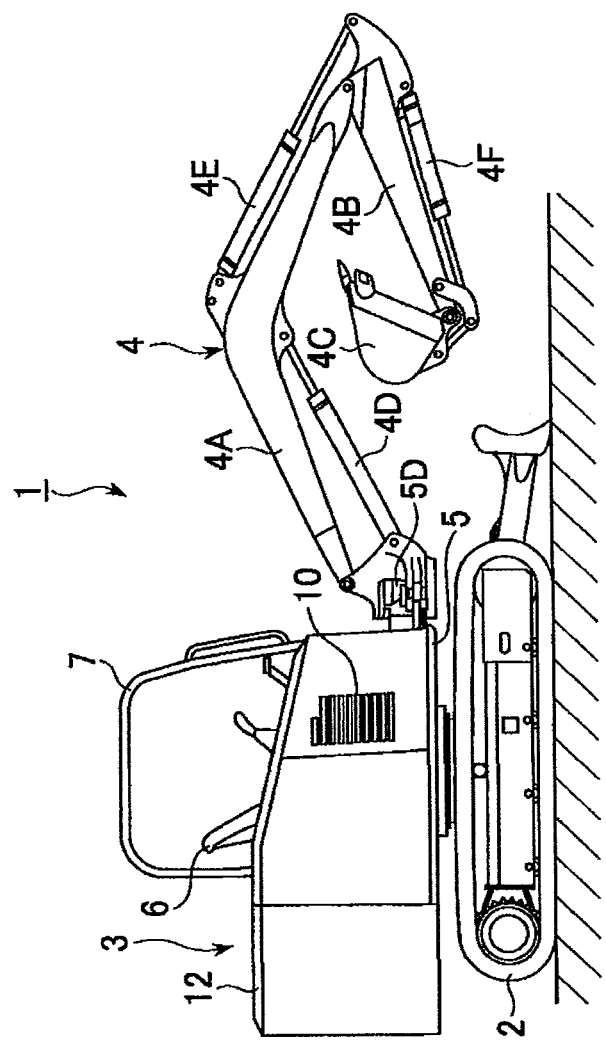
FIG. 1 is a front view showing an electric construction machine in accordance with an embodiment of the present invention.
Figure 2:
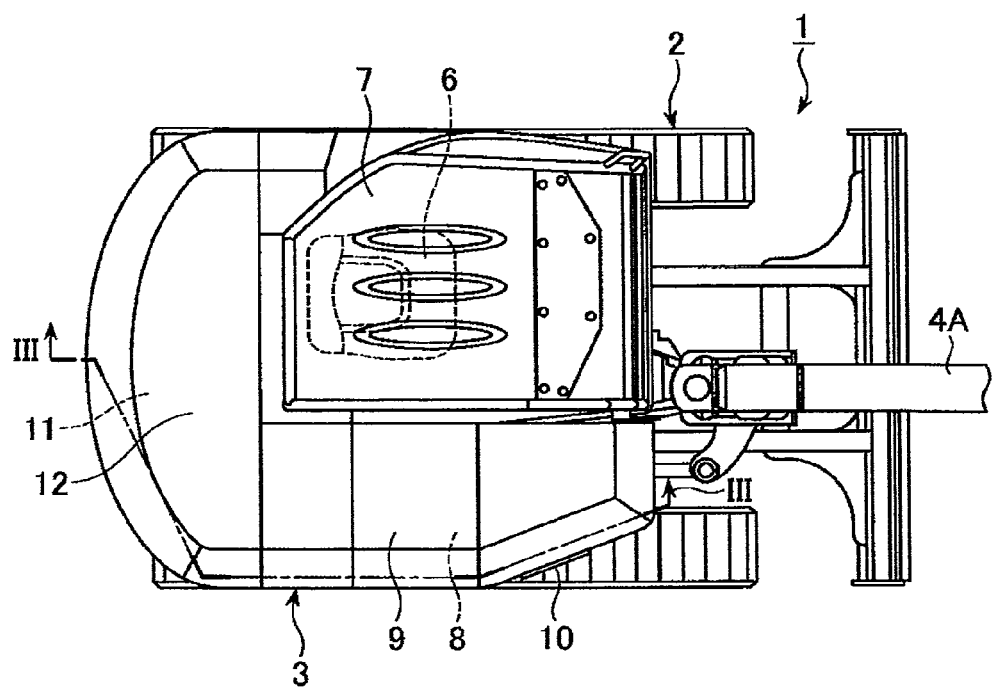
FIG. 2 is a partial plan view in which the electric construction machine of the embodiment shown in FIG. 1 is viewed from above.

FIG. 1 is a front view showing the electric construction machine in accordance with an embodiment of the present invention. FIG. 2 is a partial plan view in which the electric construction machine of the embodiment shown in FIG. 1 is viewed from above. In FIGS. 1 and 2, the reference character "1" represents an electric hydraulic shovel as an example of the electric construction machine. The hydraulic shovel 1 comprises a traveling structure 2 of the crawler type capable of traveling by itself and a swing structure 3 mounted on the traveling structure 2 to be capable of swiveling. The swing structure 3 constitutes the vehicle body of the hydraulic shovel 1 together with the traveling structure 2. A front part of the swing structure 3 is equipped with a work implement 4 of the swinging type for performing earth/sand excavation, etc. The work implement 4 is made up of a boom 4A, an arm 4B, a bucket 4C, a boom cylinder 4D, an arm cylinder 4E, a bucket cylinder 4F, etc.

The swing structure 3 swivels around its swiveling center P on the traveling structure 2. A cab seat 6 and its canopy 7 are arranged in a left front part of the space over a swiveling frame 5 of the swing structure 3. A machine room 8 storing devices such as a hydraulic pump, an electric motor, an inverter, an oil tank, a heat exchanger and a cooling fan which will be explained later and a machine room exterior cover 9 covering the machine room 8 are arranged in a right front part of the space over the swiveling frame 5. An exhaust hole 10 for discharging air fanned by the cooling fan to the outside is formed in a front part of the machine room exterior cover 9.

A battery storage room 11 storing a battery structure which will be explained later is arranged in a rear part of the space over the swiveling frame 5. A battery storage room exterior cover 12 is provided to cover the battery storage room 11.

Next, the configuration inside the aforementioned machine room 8 and battery storage room 11 will be described referring to FIGS. 3 and 4.

Figure 3:
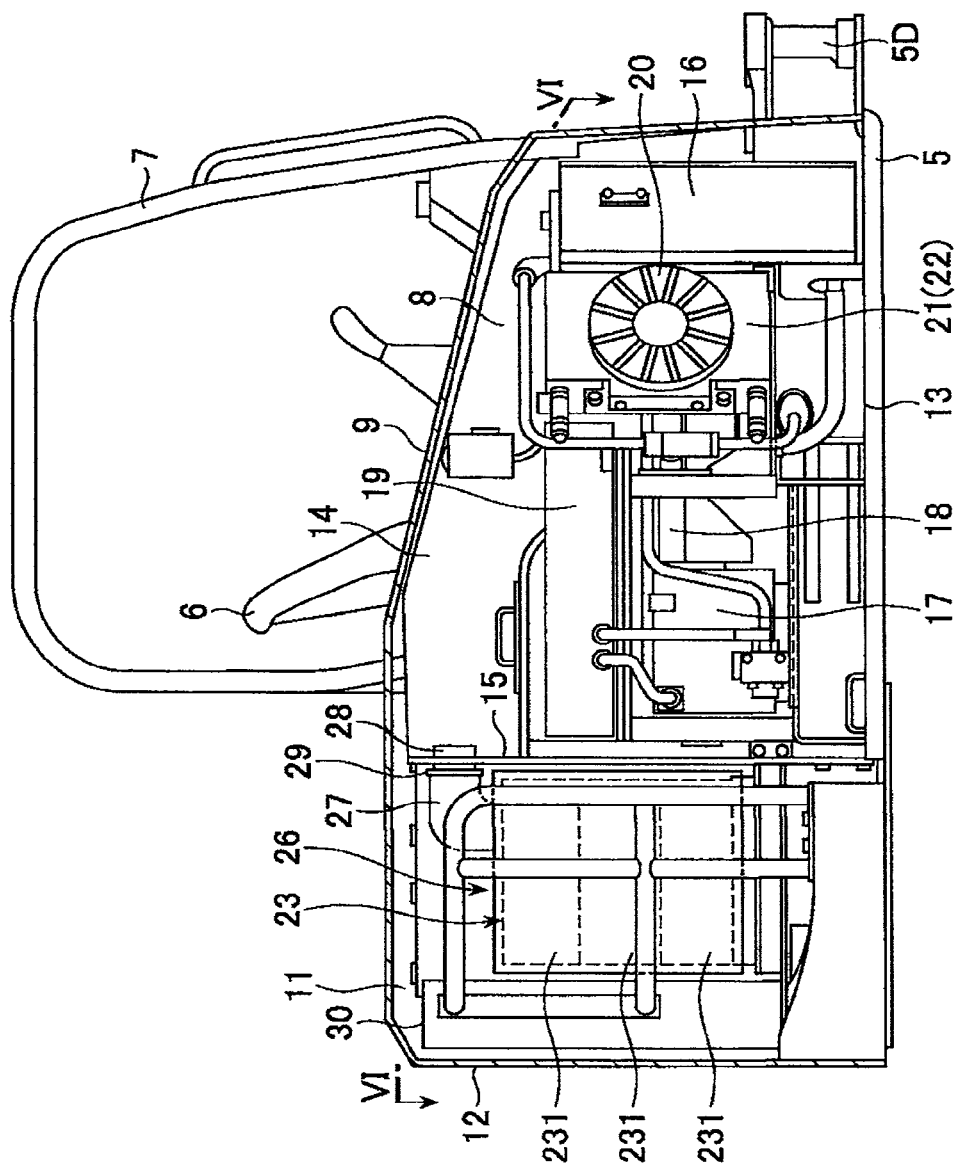
FIG. 3 is a cross-sectional view of the electric construction machine of the embodiment shown in FIG. 2 viewed in the direction III-III in FIG. 2.

FIG. 3 is a cross-sectional view of the electric construction machine of the embodiment shown in FIG. 2 viewed in the direction III-III in FIG. 2. FIG. 4 is a cross-sectional view of the electric construction machine of the embodiment shown in FIG. 3 with the canopy viewed in the direction IV-IV in FIG. 3. In FIGS. 3 and 4, reference characters identical with those in FIG. 1 or FIG. 2 represent the same components as in FIG. 1 or FIG. 2

First, the arrangement of devices installed in the machine room 8 will be described referring to FIGS. 3 and 4. The electric hydraulic shovel 1 is equipped with a hydraulic pump, an electric motor, etc. as its driving sources. By driving the hydraulic pump with the electric motor, hydraulic operating fluid for operations is supplied from the hydraulic pump to hydraulic devices such as hydraulic motors for the traveling and the swiveling (unshown) and the cylinders 4D, 4E and 4F constituting the work implement 4. Therefore, the aforementioned devices, etc. are installed in the machine room 8.

The machine room 8 is formed of the aforementioned machine room exterior cover 9, a base plate 13, a longitudinal partition plate 14 provided in the vicinity of the cab seat 6 to extend in the longitudinal direction of the swiveling frame 5, and a transverse partition plate 15 provided in a rear part of the swing structure 3 to extend in the transverse direction of the swiveling frame 5.

An oil tank 16 storing the hydraulic operating fluid to be supplied to the hydraulic devices of the hydraulic shovel 1 is arranged in a front part of the machine room 8. An electric motor 17 which is driven by electric power from batteries (explained later) is installed in a lower rear part of the machine room 8. The electric motor 17 is connected with a hydraulic pump 18. Being driven by the electric motor 17, the hydraulic pump 18 discharges the hydraulic fluid for operations (hydraulic operating fluid) to various hydraulic devices mounted on the hydraulic shovel 1.

An inverter 19 is arranged over the electric motor 17 in the machine room 8. A cooling fan 20 for discharging hot air inside the machine room 8 to the outside of the machine room 8 is arranged at a position in the machine room 8 facing the exhaust hole 10 formed in the front part of the machine room exterior cover 9. A heat exchanger 21 for cooling down the hydraulic operating fluid (returning fluid) returning from the hydraulic devices to the oil tank 16 and an oil cooler 22 for cooling down coolant supplied to the electric motor 17 and the inverter 19 are arranged behind the cooling fan 20 (on the air intake side of the cooling fan 20 inside the machine room 8).

Next, the configuration inside the battery storage room 11 will be described referring to FIGS. 3-7.

Figure 5:
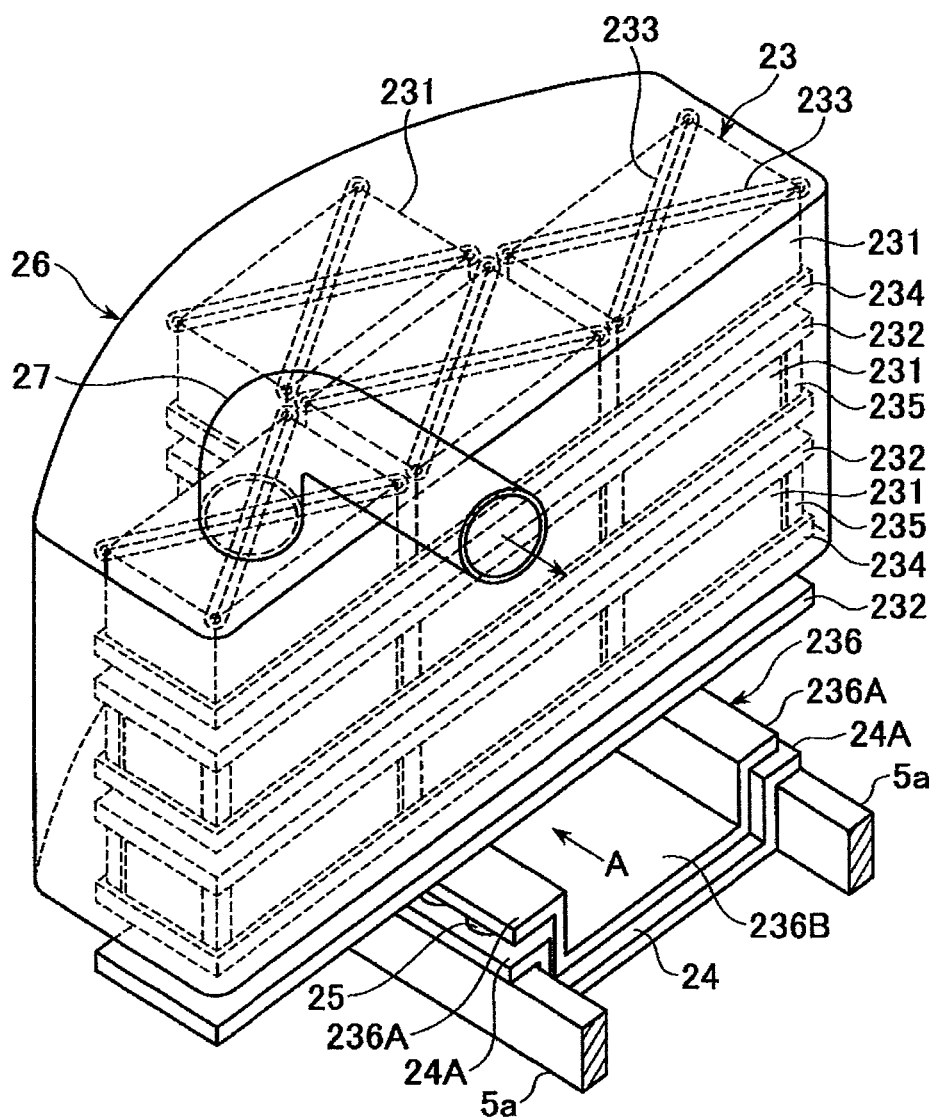
FIG. 5 is a perspective view showing a battery storage structure constituting the electric construction machine in accordance with the embodiment of the present invention.
Figure 6:
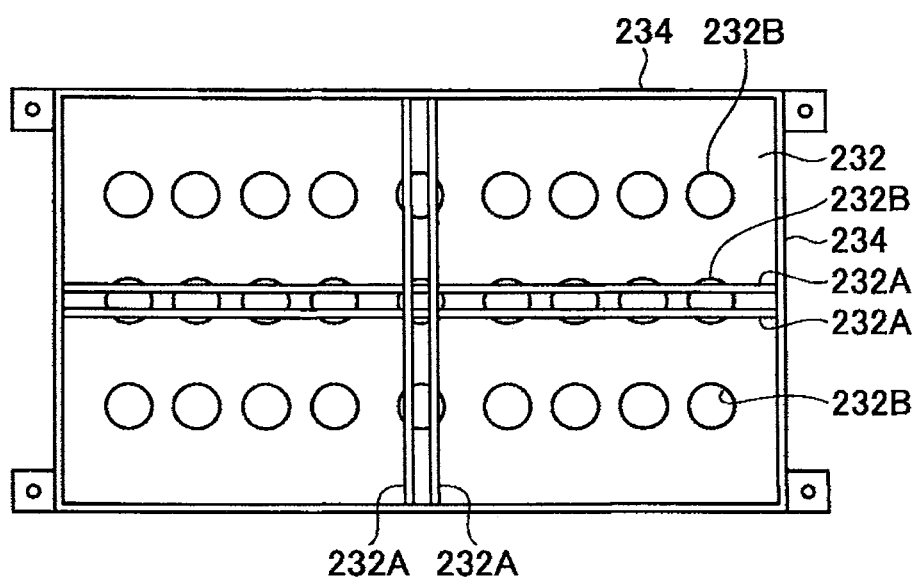
FIG. 6 is a plan view showing a base plate of the battery storage structure constituting the electric construction machine in accordance with the embodiment of the present invention.
Figure 7:
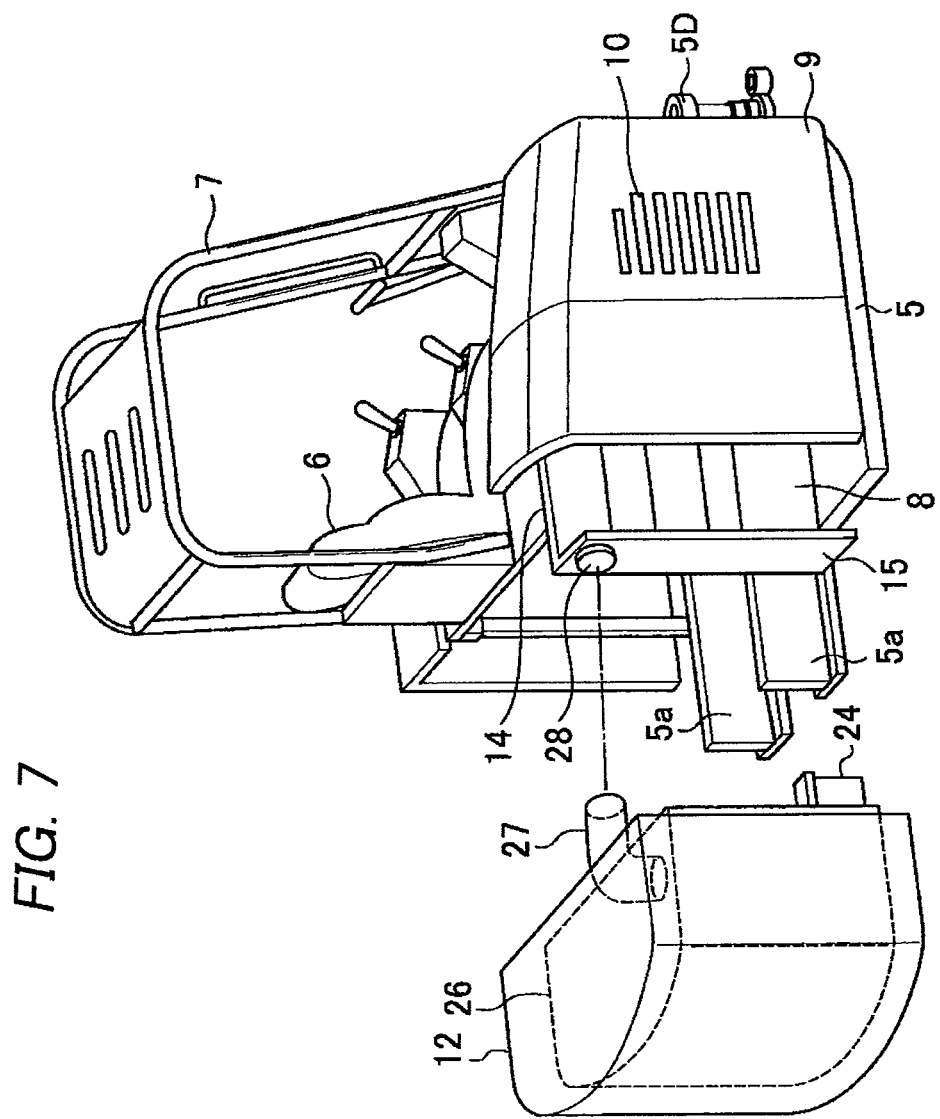
FIG. 7 is a perspective view showing a state in which the battery storage structure constituting the electric construction machine in accordance with the embodiment of the present invention has been detached from the swing structure.

FIG. 5 is a perspective view showing a battery storage structure constituting the electric construction machine in accordance with the embodiment of the present invention. FIG. 6 is a plan view showing a base plate of the battery storage structure constituting the electric construction machine in accordance with the embodiment of the present invention. FIG. 7 is a perspective view showing a state in which the battery storage structure constituting the electric construction machine in accordance with the embodiment of the present invention has been detached from the swing structure.

Figure 4:
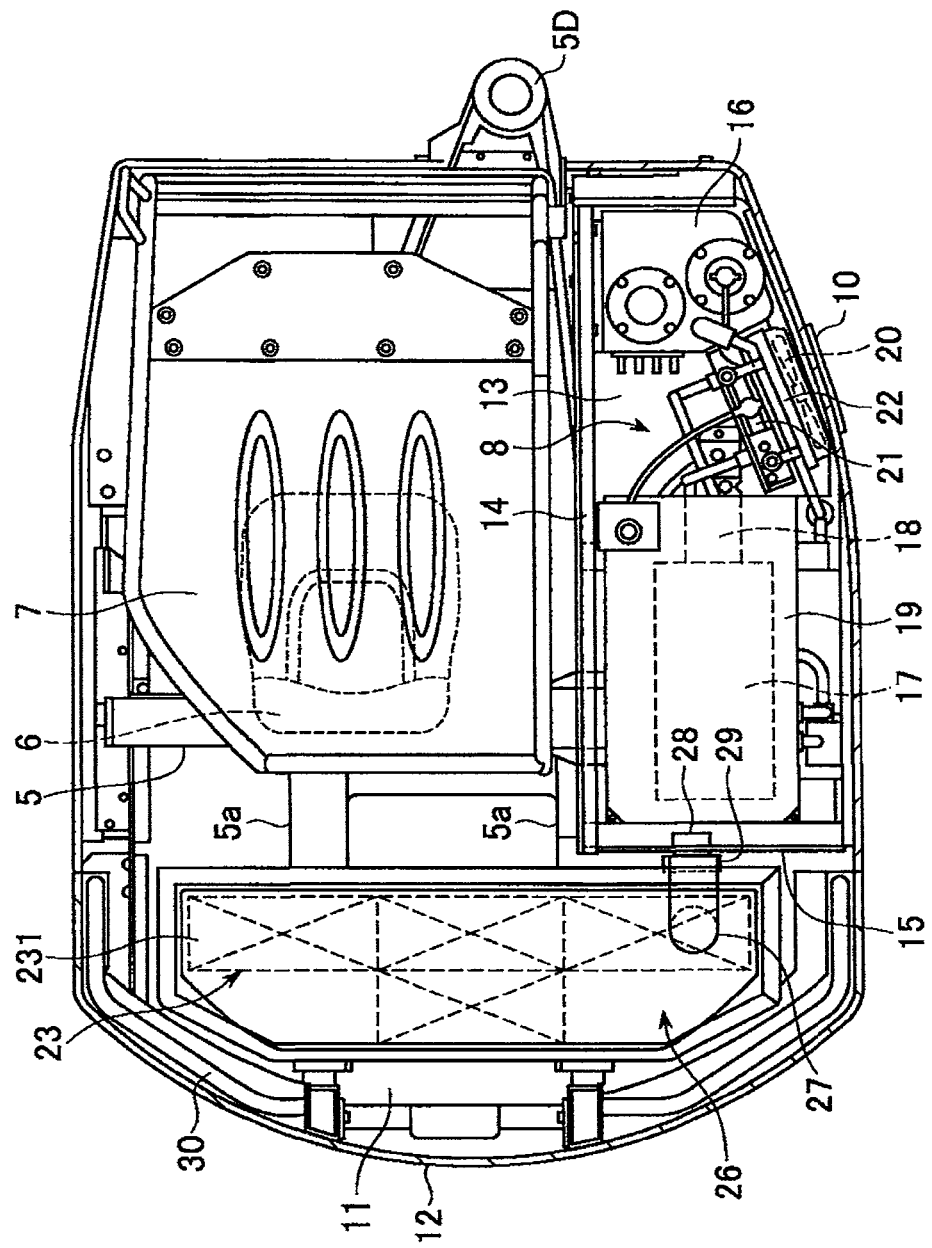
FIG. 4 is a cross-sectional view of the electric construction machine of the embodiment shown in FIG. 3 with a canopy viewed in the direction IV-IV in FIG. 3.

Referring to FIGS. 3-7, a rack-like battery storage structure 23, capable of storing a plurality of batteries, is installed in the battery storage room 11 in the rear part of the space over the swiveling frame 5 as shown in FIGS. 3 and 4. As shown in FIG. 4, the battery storage structure 23 is detachably mounted on two rear beams 5a of the swiveling frame 5 extending in the longitudinal direction of the swing structure 3 in a rear part of the swing structure 3. By taking advantage of the weight of the batteries, the battery storage structure 23 serves also as a counter weight of the electric construction machine. The battery storage structure 23 can be detached from the rear beams 5a of the swiveling frame 5 as shown in FIG. 7 in order to replace the batteries.

As shown in FIG. 5, the battery storage structure 23 includes a plurality of batteries 231, multiple stages of battery tables 232 storing and holding the batteries 231 in multiple stages in the vertical direction of the swiveling frame 5 and in multiple columns in the transverse direction of the swiveling frame 5, a battery fixation plate 233 fixing the top of the batteries 231 arranged on the battery tables 232, battery slidepreventive frames 234 each formed on the periphery of each battery table 232, and posts 235 arranged between the battery tables 232. In this example, the battery storage structure 23 includes three stages in the vertical direction of the swiveling frame 5 and three columns in the transverse direction of the swiveling frame 5 and two columns at the center, in the longitudinal direction of the swiveling frame 5, storing twelve batteries 231 in total.

As shown in FIG. 6, each battery table 232 of the battery storage structure 23 has a plurality of air vents 232B and multiple beams 232A provided on top of the battery table 232 for supporting the batteries at an elevated position.

Based on the configuration of the battery storage structure 23 described above, an air flow channel, through which air can flow upward from a lower part of the battery storage structure 23 flow upward by the batteries 231 from those on the lowermost stage to those on the uppermost stage is formed inside the battery storage structure 23. Thus, the heat emitted by the batteries 231 ascends actively due to the upward air flow passing by the batteries 231.

The battery storage structure 23 is mounted on the two rear beams 5a of the swiveling frame 5 using a battery storage structure setting table 236 and a connecting body 24 as shown in FIG. 5. As shown in FIG. 5, the battery storage structure setting table 236 includes two flanges 236A extending in the longitudinal direction of the swiveling frame 5 and a flange connecting body 236B provided between the flanges 236A to be convex downward. The flange connecting body 236B forms a space for taking in air in the longitudinal direction of the swiveling frame 5 as indicated by the arrow A.

Between the rear beams 5a of the swiveling frame 5, a connecting body 24 having a similar configuration to the aforementioned battery storage structure setting table 236 is fixed as shown in FIG. 5. Vibration-proof rubber 25 is sandwiched between each flange 24A of the connecting body 24 and the corresponding flange 236A of the battery storage structure setting table 236. The vibration-proof rubber 25 is used for suppressing transmission of the vibration of the swing structure to the battery storage structure 23.

The battery storage structure 23 is provided with a covering sheet 26 which entirely covers the top and side faces of the battery storage structure 23 as shown in FIG. 5. To the top of the covering sheet 26, one end of a duct 27 is connected. The other end of the duct 27 is connected to one side of a connection duct 28 provided through the transverse partition plate 15 of the machine room 8 as shown in FIG. 3 using a fastening band 29.

The covering sheet 26 and the duct 27 are formed of flexible material that does not allow air through, such as vinyl, nonwoven fabric or cloth having a coated inner surface.

Incidentally, the reference character "30" in FIGS. 3 and 4 represents a guard for protecting the battery storage structure 23. The guard 30 is fixed on the battery storage structure setting table 236.

Next, the operation of the above electric construction machine in accordance with the embodiment of the present invention will be described below.

In order to conduct earth/sand excavation, etc. with the electric hydraulic shovel 1, the hydraulic pump 18 is driven first by activating the electric motor 17.

In this state, the operator seated on the cab seat 6 moves the hydraulic shovel 1 to the worksite by driving the traveling structure 2 by operating traveling levers/pedals (unshown). After reaching the worksite, the operator operates control levers (unshown) to carry out work such as earth/sand excavation by swiveling the swing structure 3 and moving the work implement 4.

When the hydraulic shovel 1 is in operation, a cooling air flow is created in the machine room 8 by driving the electric cooling fan 20. The cooling air flow cools down the hydraulic pump 18, the electric motor 17, the inverter 19, the oil tank 16, the heat exchanger 21, the oil cooler 22, etc. inside the machine room 8 and discharges the heat emitted by these devices from the machine room 8 to the outside through the exhaust hole 10 formed in the front part of the machine room exterior cover 9.

The top and side faces of the battery storage structure 23 in the battery storage room 11 are covered with the covering sheet 26. Since the space inside the covering sheet 26 is connected with the machine room 8 via the duct 27 and the connection duct 28, cooling air taken in from the outside flows upward through the space inside the covering sheet 26 to cool the batteries 231 from those on the lowermost stage to those on the uppermost stage.

Thus, heat emitted by the batteries during the electric charging/discharging ascends inside the covering sheet 26 and is forcefully discharged to the outside by the aforementioned cooling air flow through the duct 27, the connection duct 28, the machine room 8 and the exhaust hole 10. Therefore, the batteries 231 are actively cooled down and can constantly be kept at an appropriate temperature. Consequently, the supply of the electric power from the batteries 231 to the electric motor 17, etc. can be continued stably over a long period of time, achieving enhanced reliability of the hydraulic shovel 1.

Further, since the batteries 231 stored in the battery storage structure 23 are covered with the bag-like covering sheet 26, infiltration of rainwater and dust particles can be blocked. Thus, electric leaks and deterioration of the batteries 231 can be prevented. Consequently, the reliability and operating life of each battery 231 can be increased.

For replacement, maintenance, charging, etc. of a battery 231 stored in the battery storage structure 23, the battery storage structure 23 can be exposed with ease by rolling up the covering sheet 26. Thus, workability of the replacement, maintenance, charging, etc. of the batteries 231 is not impaired.

Figure 8:
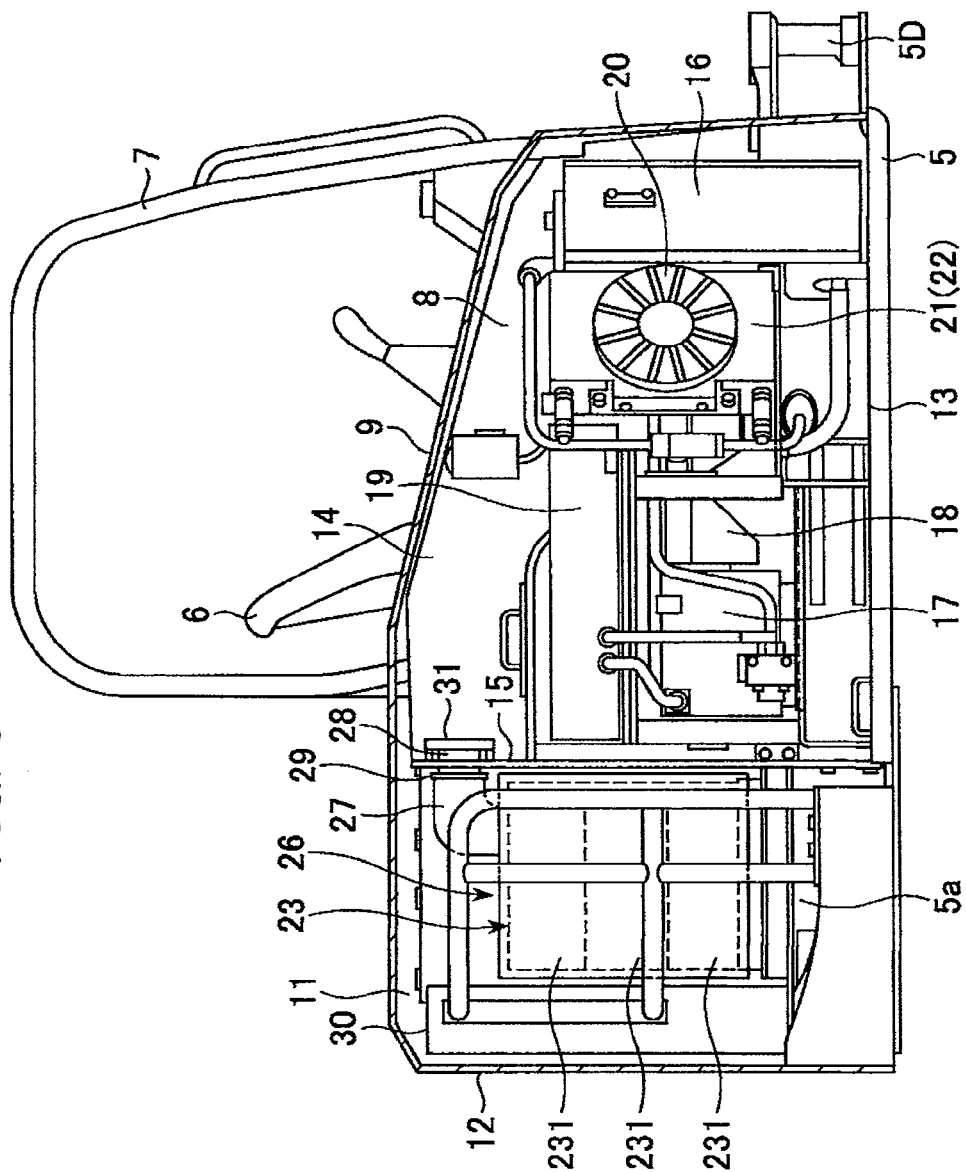
FIG. 8 is a partial cross-sectional front view showing an electric construction machine in accordance with another embodiment of the present invention.

FIG. 8 is a partial cross-sectional front view showing an electric construction machine in accordance with another embodiment of the present invention, wherein reference characters identical with those in FIG. 3 represent the same components as in FIG. 3. In this embodiment, the connection duct 28 provided through the transverse partition plate 15 of the machine room 8 is equipped with an exhaust fan 31. The exhaust fan 31 is used when the batteries 231 are charged. Since an external power source exists in the vicinity of the exhaust fan 31 when the batteries 231 are charged, the external power source is used as the power source for driving the exhaust fan 31.

Incidentally, while the covering sheet 26 and the duct 27 are formed of flexible sheets not allowing air through and having the waterproof property (vinyl, nonwoven fabric, cloth having a coated inner surface, etc.) in the above embodiments, the covering sheet 26 may also be formed of an antistatic sheet. By forming the covering sheet 26 with an antistatic sheet, accidents such as short circuits during the checkup of the batteries 231 can be prevented.

While one end of the duct 27 is connected to the top of the covering sheet 26 in the above embodiments, the end of the duct 27 may also be connected to an upper part of one of the side faces of the covering sheet 26. In this case, the need of arranging the end part of the duct 27 above the covering sheet 26 is eliminated. Thus, a space can be reserved above the covering sheet 26 and extra batteries 231 can further be installed in the space. Further, it is possible to provide the connection duct 28 not through the transverse partition plate 15 but through the longitudinal partition plate 14 constituting the machine room 8 and connect the other end of the duct 27 to one side of the connection duct 28. It is also possible to vertically arrange a bracket with a hole in an upper part of the battery storage structure 23 and connect the bracket's hole to the covering sheet 26 and to the connection duct 28 of the transverse partition plate 15 of the machine room 8 using the duct 27.

The covering sheet 26 may either be formed integrally or by connecting a plurality of sheets together.

While the battery storage structure 23 is installed in the battery storage room 11 formed in the rear part of the swing structure 3 in the above embodiments, the position of installing the battery storage structure 23 may be changed and the number of batteries 231 may also be changed and set properly.

Furthermore, while a hydraulic shovel 1 has been taken as an example of the electric construction machine in the above embodiments, the present invention is applicable also to a wide range of other construction machines such as wheel loaders and hydraulic cranes.

DESCRIPTION OF REFERENCE CHARACTERS 1 hydraulic shovel (construction machine)
3 swing structure
5 swiveling frame
8 machine room
9 machine room exterior cover
10 exhaust hole
11 battery storage room
12 battery storage room exterior cover
20 cooling fan
23 battery storage structure
231 battery
26 covering sheet
27 duct
28 connection duct
31 exhaust fan

The invention claimed is:

1. An electric construction machine in which a battery storage room is formed in a rear part of a swing structure and a plurality of batteries as electric power sources are arranged in the battery storage room, comprising:
a battery storage structure storing the batteries and having an air flow channel through which air can flow upward from a lower part of the battery storage structure;
a flexible covering sheet entirely covering the top and side faces of the battery storage structure; and
a duct for discharging the air, one end of which is arranged in an upper part of the covering sheet,
wherein the swing structure includes two rear beams extending in the longitudinal direction of the swing structure in a rear part thereof and mounting the battery storage structure thereon, and
wherein the battery storage structure includes plural stages of battery tables each having a plurality of air vents and storing and holding the batteries in multiple stages in the vertical direction and in multiple columns in the transverse direction of the swing structure, the two rear beams forming a space therebetween for taking in air and the plurality of air vents forming an air flow channel through which air flows upwards from the lowermost stage to the uppermost stage.

2. The electric construction machine according to claim 1, wherein the other end of the duct is connected to a room from which air is forcefully discharged.

3. The electric construction machine according to claim 2, wherein the room from which air is forcefully discharged is a machine room which is provided in the swing structure to store devices including a hydraulic pump, an electric motor, an inverter, an oil tank, a heat exchanger, a cooling fan and which discharges air from the inside to the outside of the room with the cooling fan.

4. The electric construction machine according to claim 3, wherein the one end of the duct is connected to the top of the covering sheet.

5. The electric construction machine according to claim 3, wherein the one end of the duct is connected to an upper part of one of the side faces of the covering sheet.

6. The electric construction machine according to claim 3, wherein the covering sheet is formed of a waterproof sheet.

7. The electric construction machine according to claim 3, wherein the covering sheet is formed of an antistatic sheet.

8. The electric construction machine according to claim 2, wherein the other end of the duct is equipped with an exhaust fan.

9. The electric construction machine according to claim 8, wherein the one end of the duct is connected to the top of the covering sheet.

10. The electric construction machine according to claim 8, wherein the one end of the duct is connected to an upper part of one of the side faces of the covering sheet.

11. The electric construction machine according to claim 8, wherein the covering sheet is formed of a waterproof sheet.

12. The electric construction machine according to claim 8, wherein the covering sheet is formed of an antistatic sheet.

13. The electric construction machine according to claim 2, wherein the one end of the duct is connected to the top of the covering sheet.

14. The electric construction machine according to claim 2, wherein the one end of the duct is connected to an upper part of one of the side faces of the covering sheet.

15. The electric construction machine according to claim 2, wherein the covering sheet is formed of a waterproof sheet.

16. The electric construction machine according to claim 2, wherein the covering sheet is formed of an antistatic sheet.

17. The electric construction machine according to claim 1, wherein the one end of the duct is connected to the top of the covering sheet.

18. The electric construction machine according to claim 17, wherein the covering sheet is formed of a waterproof sheet.

19. The electric construction machine according to claim 17, wherein the covering sheet is formed of an antistatic sheet.

20. The electric construction machine according to claim 1, wherein the one end of the duct is connected to an upper part of one of the side faces of the covering sheet.

21. The electric construction machine according to claim 20, wherein the covering sheet is formed of a waterproof sheet.

22. The electric construction machine according to claim 20, wherein the covering sheet is formed of an antistatic sheet.

23. The electric construction machine according to claim 1, wherein the covering sheet is formed of an antistatic sheet.

24. The electric construction machine according to claim 1, wherein the one end of the duct is connected to an upper part of one of the side faces of the covering sheet.

25. The electric construction machine according to claim 1, wherein the covering sheet is formed of a waterproof sheet.

* * * * *